(12) United States Patent
D'Angelo et al.

(10) Patent No.: US 7,124,063 B2
(45) Date of Patent: Oct. 17, 2006

(54) MODULE WITH SENSOR MEANS FOR MONITORING INDUSTRIAL PROCESSES

(75) Inventors: Giuseppe D'Angelo, Grugliasco (IT); Giorgio Pasquettaz, Vercelli (IT); Andrea Terreno, Orbassano (IT)

(73) Assignee: C.R.F. Societa Consortile per Aziono, Orbassano (IT)

( * ) Notice: Subject to any disclaimer, the term of this patent is extended or adjusted under 35 U.S.C. 154(b) by 0 days.

(21) Appl. No.: 11/244,049

(22) Filed: Oct. 6, 2005

(65) Prior Publication Data

US 2006/0149508 A1    Jul. 6, 2006

(30) Foreign Application Priority Data

Dec. 30, 2004   (EP)   ................... 04425962

(51) Int. Cl.
*G06F 11/00*   (2006.01)
(52) U.S. Cl. .................. 702/188; 702/182; 702/183; 702/184; 702/185; 702/186; 702/187
(58) Field of Classification Search ................ 702/188, 702/182–187, 56; 700/9; 709/217, 223, 709/224
See application file for complete search history.

(56) References Cited

U.S. PATENT DOCUMENTS 5,854,994 A * 12/1998 Canada et al. ................ 702/56
2003/0010760 A1* 1/2003 Bolognese et al. .... 219/121.67

FOREIGN PATENT DOCUMENTS

| DE | 196 43 383 | 5/1998 |
| EP | 1 275 464 | 2/2003 |
| EP | 1 361 015 | 11/2003 |
| EP | 1 371 443 | 12/2003 |
| EP | 1 275 464 | 5/2004 |
| JP | 60 079826 A | 5/1985 |
| WO | WO 2004/047043 | 6/2004 |

OTHER PUBLICATIONS

Azzi et al, "Wireless Temperature Sensing for Building Management Systems", IEE Colloquium on Wireless Technology (Digest No. 1996/199), Nov. 14, 1996, pp. 2-1.

* cited by examiner

*Primary Examiner*—Marc S. Hoff
*Assistant Examiner*—Phuong Huynh
(74) *Attorney, Agent, or Firm*—Nixon & Vanderhye PC

(57) ABSTRACT

The invention describes a system for monitoring industrial processes, comprising sensor means for detecting one or more process quantities in at least one process station, acquisition means for acquiring measuring signals emitted by said sensor means, processing means operating on signals generated by said acquisition means for obtaining process information, and means for managing the manufacturing flow operating on the basis of said information on process quality.

According to the invention, said acquisition means are arranged locally in said at least one process station and comprise means for coding said measuring signals generated by said sensor means into coded signals,
said means for managing the manufacturing flow are arranged in remote position with respect to acquisition means and there are wireless transceiver means associated to said acquisition means for sending coded signals generated by said acquisition means to said means for managing the manufacturing flow.

12 Claims, 4 Drawing Sheets

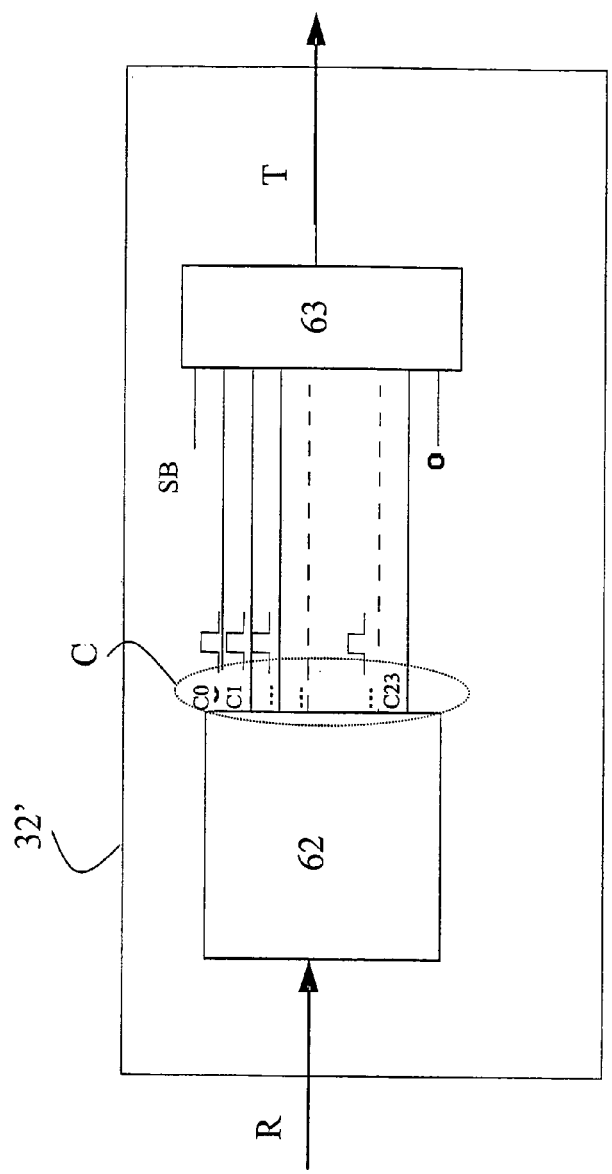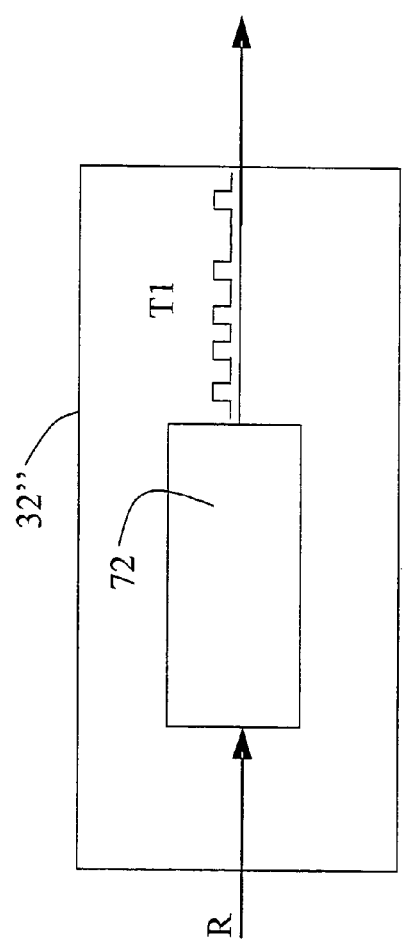

MODULE WITH SENSOR MEANS FOR MONITORING INDUSTRIAL PROCESSES

The present invention relates to systems and methods for monitoring industrial processes, comprising sensor means for detecting one or more process quantities in at least one process station, acquisition means for acquiring measuring signals emitted by said sensor means, processing means operating on signals generated by said acquisition means for obtaining process information, and means for managing the manufacturing flow operating on the basis of said information on process quality.

Methods and systems as referred to above have already been proposed and used in the past for monitoring on-line for instance laser welding processes, in particular in the case of metal sheet welding. The monitoring system can evaluate the presence of porosities in the welding area, or in the case of butt-jointed thin metal sheets, the presence of faults due to metal sheets overlapping or disjoining. Similar systems have also been used for monitoring the quality of laser cutting operations.

Figure 1:
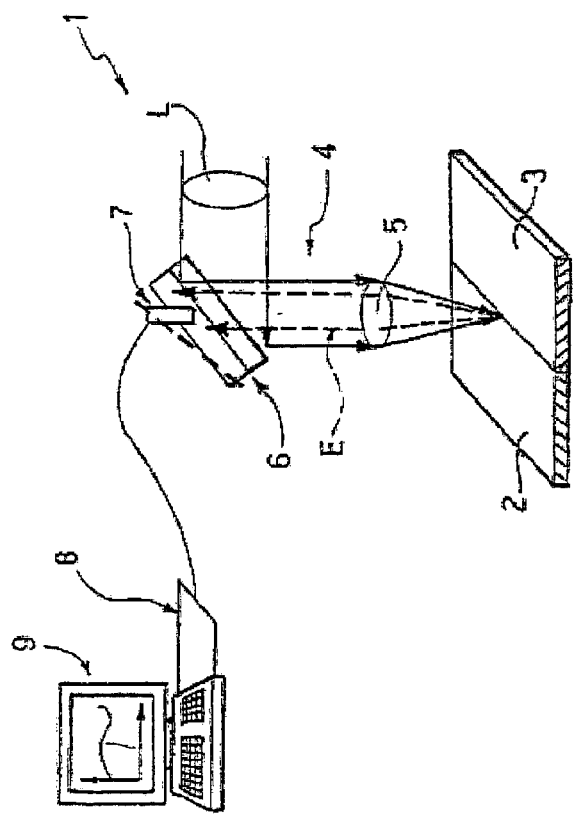

FIG. 1 shows a system for monitoring the quality of a laser process of known type.

With reference to FIG. 1, number 1 globally refers to a system for monitoring the quality of a laser process, for instance a laser welding process. The example refers to the case of two metal sheets 2, 3 welded in a working or process station by means of a laser beam. Number 4 globally refers to the focusing head, including a lens 5 reached by the laser beam originated by a laser generator (not shown) and reflected by a semi-reflecting mirror 6, after getting through a lens L. Radiation E emitted from the welding area gets through the reflecting mirror 6 and is picked up by a sensor 7 consisting of a photodiode which can send its output signal to an electronic control and processing unit 8 associated to a personal computer 9 managing the process.

In a practical embodiment, the semi-reflecting mirror 6 used is a ZnSe mirror, with a diameter of 2 inches and a thickness of 5 mm. The sensor 7 is a photodiode with spectral response of 190 to 1100 nm, an active area of 1.1×1.1 mm and a quartz window.

Figure 2:
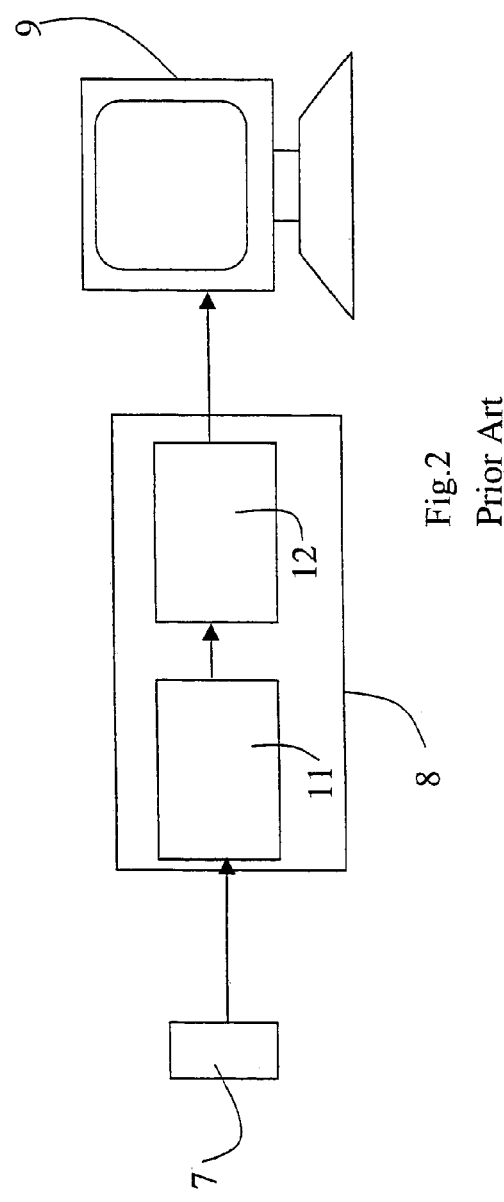

FIG. 2 shows in further detail the electronic control and processing unit 8 associated to the personal computer 9. Said processing unit 8 comprises an antialiasing filter 11 operating on the signal sent by the sensor 7, then there is an acquisition board 12 equipped with an analog-to-digital converter, which samples the filtered signal and converts it numerically. Said acquisition board 12 is connected directly to the personal computer 9.

The acquisition board 12 acquires the signal emitted by the sensor 7 at a frequency above 216 Hertz.

The personal computer 9 implements a quality monitoring system based on the analysis of the acquired signal.

The drawback of systems used until now consists in that the sensor placed inside the focusing head, which acquires the radiation coming from the welding process, is connected to the acquisition board located in the personal computer, which monitors the process through suitable cables.

Said cables, however, create problems concerning the remote arrangement of acquisition and processing systems. Moreover, said cables lead to further more serious drawbacks if more processes in various welding stations have to be monitored, because in that case more connection cables have to be laid. As a matter of fact, said connection cables should have a limited length, so as not to introduce too much noise on the signals they carry. The passage of connection cables inside the welding station leads to drawbacks due to magnetic interference with power cables. Moreover, in order to have a low noise said connection cables are high impedance cables and are therefore quite expensive.

The present invention aims at overcoming all the aforesaid drawbacks.

In view of achieving said aim, the object of the invention is a system for monitoring the quality of industrial processes having the characteristics referred to at the beginning and further characterized in that said acquisition means are placed locally in said at least one process station and comprise means for coding said measuring signals generated by said sensor means into coded signals, and in that said means for managing the manufacturing flow are arranged remotely with respect to the acquisition and processing means, and there are wireless transceiver means associated to said acquisition means for sending coded signals generated by said acquisition means to said means for managing the manufacturing flow.

In the preferred embodiment, said wireless transmission means are radio-frequency transmission means operating for instance according to Bluetooth protocol, whereas process informations are information on process quality.

Of course, an object of the invention is also the method for monitoring the quality of industrial processes implementing the system described above.

Figure 3:
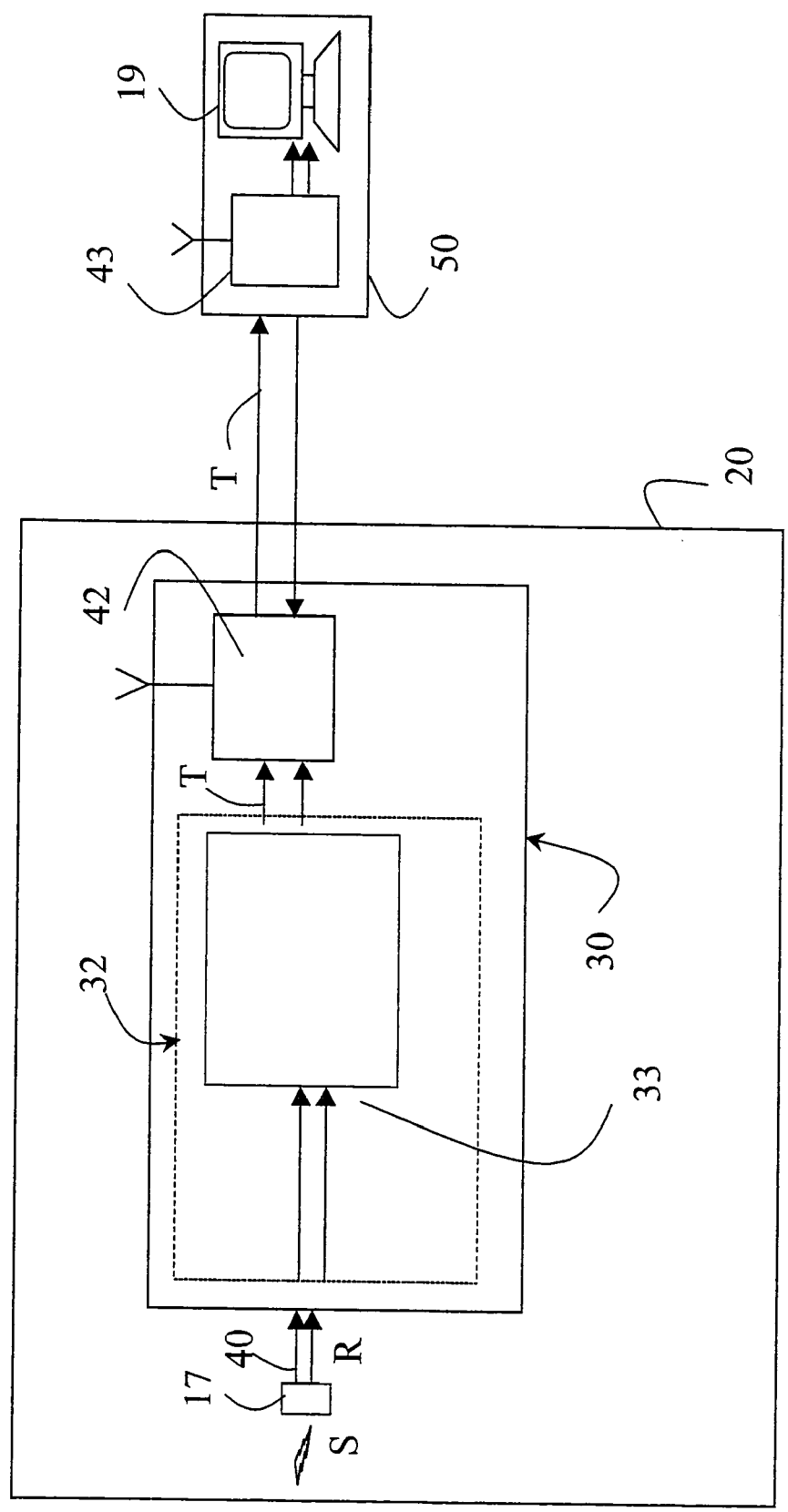
Figure 5:
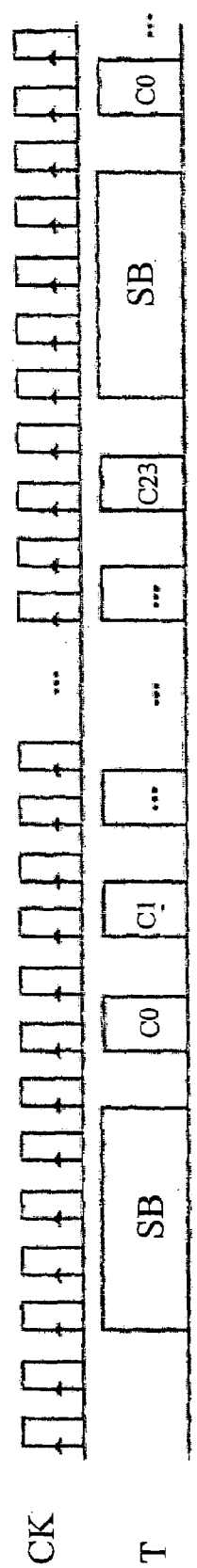

Further characteristics and advantages of the invention will be evident from the following description with reference to the accompanying drawings, provided as a mere non-limiting example, in which:

FIG. 1 is a schematic view of a system for monitoring industrial processes according to prior art, FIG. 2 is a schematic view of a detail of the system of FIG. 1, FIG. 3 is a block diagram of the system for monitoring industrial processes according to the invention, FIG. 4 is a block diagram of a first embodiment of a module of the system of FIG. 3, FIG. 5 is a diagram representing a signal generated by the module of FIG. 4, FIG. 6 is a block diagram of a second embodiment of a module of the system of FIG. 3.

In short, according to the proposed system intelligent units are arranged locally in working stations, said intelligent units being configured so as to be assembled directly onto the sensors and to acquire signals from said sensors, thus coding—still locally—said signals for a wireless transmission to remotely arranged processors, which monitor processes by evaluating faults and executing for instance reject management procedures.

FIG. 3 shows a block diagram of the system for monitoring industrial processes according to the invention, in which number 17 refers to a sensor, placed for instance inside the focusing head of a $CO_2$ laser, or inside the cavity if the laser is of neodymium-YAG type, in a working station 20. Said sensor 17 is therefore placed near the working station 20 and detects a radiation S coming from the laser welding process, thus generating an analog voltage signal R, in particular of 0 to 0.5 V.

Said analog voltage signal R is transferred to an acquisition and coding module 32.

The connection, referred to with number 40, between the sensor 17 and the acquisition module 32, according to a preferred embodiment of the invention, is a direct connection without cables. In other words, preferably, the acquisition and coding module 32 and the sensor 17 make up an integral module, for instance in form of a printed board or integrated circuit connected directly to the voltage output of the sensor 17, by welding for instance.

The acquisition module 32 is programmed so as to manage the acquisition of the analog voltage signal R from the sensor 17 and to code it through a coding module 33 included therein, which supplies a serial signal T, i.e. a serial representation of values measured by the sensor 17 for the process in progress in the adjacent working station 20. Said processing takes place by means of a procedure of process information monitoring, in particular for evaluating process quality, said procedure being implemented by a software previously loaded onto a personal computer 19. Examples of processing procedures for determining the quality of a welding process, which can be implemented into the system proposed here, can be inferred by way of non-limiting example from European patent publications EP 1361015, EP 1275464 and EP 1371443 issued to the Applicant.

The serial signal T is then transmitted through a radio transmission unit 42, which uses for instance Bluetooth protocol, in particular a Bluetooth transmitter at 2.4 GHz.

From the above description it is evident that the acquisition module 32, comprising the coding module 33, and the radio transmission unit 42 make up an intelligent elementary unit 30, contained in one housing, which is placed locally in the working station 20 and is integral with the sensor 17, or which can be integrated into the sensor 17 through a simple assembling connection, such as a rapid connection or welding.

The serial signal T sent out by the radio transmission unit 42 is then received in a remote station 50 by a corresponding radio receiving unit 43, i.e. operating on radio signals for instance of Bluetooth type.

The received signal is then transferred to the personal computer 19, for instance under RS232 protocol, which acts as supervisor of industrial processes and analyses in a known way measuring data contained in the serial signal T for evaluating welding quality.

Said supervising personal computer 19 has the specific task of managing the manufacturing flow, by executing procedures involving product reject managements and the generation of a data bank on manufacturing development on the basis of the serial signal T.

FIG. 4 shows a block diagram of a first embodiment 32' of the acquisition module, in which the sensor 17 supplies the analog voltage signal R, with an amplitude of +/− 0.5 V and at a variable frequency above 40 KHz, to a 24-bit analog-to-digital converting module 62, which carries out sampling at a sampling frequency of 32768 Hz and supplies as output a parallel signal C, comprising bits C0 ... C23. Said parallel signal C is supplied to a multiplexer 63, which generates the serial signal T as follows.

For each analog datum of the signal R sampled by the module 62 at 32768 Hz, as shown in the diagram of FIG. 5, which represents the serial signal T generated by the multiplexer 63 and a clock signal CK scanning its operation, said multiplexer 63 receives a start bit SB with a duration of 4 high bits (4 high cycles of clock).

Then the multiplexer 63 inputs the first bit C1 into a clock cycle, followed by a logic zero in the following clock cycle, then the second bit C2 and one more zero, each input being for a clock cycle, until the last bit C23 is input, followed in the following clock cycle by a last zero. Zero input into the multiplexer 63 is represented by a suitable input 0 in FIG. 4.

Thus, for each analog datum of the signal R acquired at 32768 Hz, 53 bits are transmitted serially into the serial signal T. This means that the output frequency of the serial signal T is of at least 53*32768=1736704 Hz, which can however be easily supported by the transmitter 42 operating at 2.4 GHz.

FIG. 6 shows a second embodiment 32", in which a voltage-to-frequency converting module 72 is used as acquisition and coding module.

Said module 72 converts analog data into a variable frequency pulse train T1, i.e. with pulses at a different distance, as shown in FIG. 6. Frequency variation in the train T1 varies depending on the amplitude of the analog datum.

Thanks to the characteristics referred to above, the system according to the invention provides an intelligent module equipped with sensors, which represents an elementary unit acquiring, coding and transmitting process monitoring data from the working station where the industrial process is executed to a remote station in which process quality is monitored and manufacturing flow is managed.

Advantageously, in the system according to the invention the intelligent unit comprises simple modules such as for instance a converter and a multiplexer, which require no particular configuration for suiting different types of sensor, also measuring different quantities. In other words, the intelligent unit advantageously does not depend on the type of sensor, so that since there are several types of sensors monitoring one or more working stations, each sensor can be associated to a related identical intelligent unit according to the invention, through a simple assembling operation such as pin bonding on a printed circuit.

The system according to the invention enables to build an intelligent network, made up of a given number of intelligent elementary units which interact conveniently with the supervising processor with remote arrangement. The proposed solution thus enables to manage simultaneously various manufacturing areas, if necessary also of different nature, since the single process is managed by the corresponding intelligent elementary unit.

By using wireless communication and thus eliminating connection cables between sensor and acquisition card on board of the personal computer, the system according to the invention makes it possible to implement multisensor elementary monitoring units. Said multisensor units would have proved difficult to implement by means of cables, since a plurality of cables for the signal would have been required.

Thanks to the elimination of connection cables, the system according to the invention further eliminates the problem of noise due to the length of cables for the connection to the managing computer, when said cables get through the working station, thus obtaining also an evident cost reduction, since high impedance cables should not be used so as to have a low noise.

Thanks to the small size of the monitoring and acquisition module, the system according to the invention is further of very simple installation, also in existing working stations, which are not therefore already prepared on purpose.

Obviously, though the basic idea of the invention remains the same, construction details and embodiments can widely vary with respect to what has been described and disclosed by mere way of example, without however leaving the framework of the present invention.

As far as the wireless transmission module is concerned, it can implement radio-frequency transmission protocols and methods differing from "Bluetooth™" standard, both available on the market and produced on purpose, provided that they can transmit the quality signal to the desired distance and with the required band specification. Concerning this, it should be pointed out that since the quality signal requires a very small bandwidth for its transmission, various choices can be made in the system according to the invention, such as for instance use of a very simple transmitter with limited band, or use of a transmitter with wider band, for instance available on the market, and use of the band not involved in quality signal transmission for implementing error correction techniques, transmission of parity codes or transmission of signal with redundancy.

The invention claimed is:

1. A system for monitoring industrial processes, comprising sensor means for detecting one or more process quantities in at least one process station, acquisition means for acquiring measuring signals emitted by said sensor means, processing means operating on signals generated by said acquisition means for obtaining information on the process quality, and means for managing the manufacturing flow operating on the basis of said information on process quality, wherein said acquisition means are arranged locally in said at least one process station and comprise means for coding said measuring signals generated by said sensor means into coded signals, said means for managing the manufacturing flow and processing means operating on signals generated by said acquisition means for obtaining information on the process quality are arranged in remote position with respect to said acquisition means and there are wireless transceiver means associated to said acquisition means for sending the coded signals generate by said acquisition means to said means for managing the manufacturing flow, said acquisition means comprising an analog-to-digital converter operating on said measuring signal operating at a freguency above 30 KHz.

2. The system according to claim 1, wherein said wireless transceiver means operate at radio-frequency.

3. The system according to claim 2, wherein said radio-frequency transceiver means operate according to Bluetooth™ standard.

4. The system according to claim 2, wherein said coding means comprise a multiplexer for generating said coded signals in form of serial signal.

5. The system according to claim 3, wherein said acquisition means comprise a voltage-to-frequency converter for converting said measuring signal into a variable frequency pulse train.

6. The system according to claim 4, wherein said radio-frequency transmission means included in said transceiver means are associated to said acquisition means into an intelligent unit arranged locally in said at least one process station.

7. The system according to claim 6, wherein said intelligent unit is an integral module together with said sensor means.

8. The system according to claim 6, wherein there is a plurality of said intelligent units, which are arranged locally in corresponding working stations, said means for managing the manufacturing flow being configured so as to manage said working stations on the basis of said process information transmitted by said plurality of intelligent units.

9. The system according to claim 1, wherein said means for managing the manufacturing flow are configured so as to execute procedures involving reject management and the generation of a data base on manufacturing development on the basis of process information.

10. The system according to claim 1, wherein said process information is information on process quality.

11. The system according to claim 1, wherein said process station executes a laser welding process.

12. A method for monitoring industrial processes, comprising the operations of detecting one or more processes quantities in at least one process station, acquiring of signals generated in said detection operation, processing for obtaining process information, managing of a manufacturing flow on the basis of said process information, wherein it further comprises the following operations:

execution of said operation involving acquisition locally corresponding to said process, said acquisition operation involving a coding step of said measuring signals generated in said detection operation, execution of said operation involving management of the manufacturing flow in remote position with respect to said process, wireless transmission of said process information obtained in the process station for executing the operation involving management of the manufacturing flow in remote position, said operations being executed through the system according to claim 1.

* * * * *

UNITED STATES PATENT AND TRADEMARK OFFICE
CERTIFICATE OF CORRECTION

PATENT NO.       : 7,124,063 B2
APPLICATION NO.  : 11/244649
DATED            : October 17, 2006
INVENTOR(S)      : D'Angelo et al.

Page 1 of 1

It is certified that error appears in the above-identified patent and that said Letters Patent is hereby corrected as shown below:

Title page, item (73) should read as follows:

(73)    Assignee:    C.R.F. Societa Consortile per Azioni
                     Orbassano (Torino), Italy Signed and Sealed this Twentieth Day of February, 2007

JON W. DUDAS
*Director of the United States Patent and Trademark Office*

UNITED STATES PATENT AND TRADEMARK OFFICE
CERTIFICATE OF CORRECTION

PATENT NO.         : 7,124,063 B2                                           Page 1 of 1
APPLICATION NO.    : 11/244049
DATED              : October 17, 2006
INVENTOR(S)        : D'Angelo et al.

It is certified that error appears in the above-identified patent and that said Letters Patent is hereby corrected as shown below:

Title page, item (73) should read as follows:

(73)    Assignee:    C.R.F. Societa Consortile per Azioni
                     Orbassano (Torino), Italy This certificate supersedes Certificate of Correction issued February 20, 2007.

Signed and Sealed this

Thirteenth Day of March, 2007

JON W. DUDAS
*Director of the United States Patent and Trademark Office*